Aug. 4, 1953 J. M. WILLIAMS ET AL 2,647,694
LEAF GRINDER
Filed Sept. 3, 1949
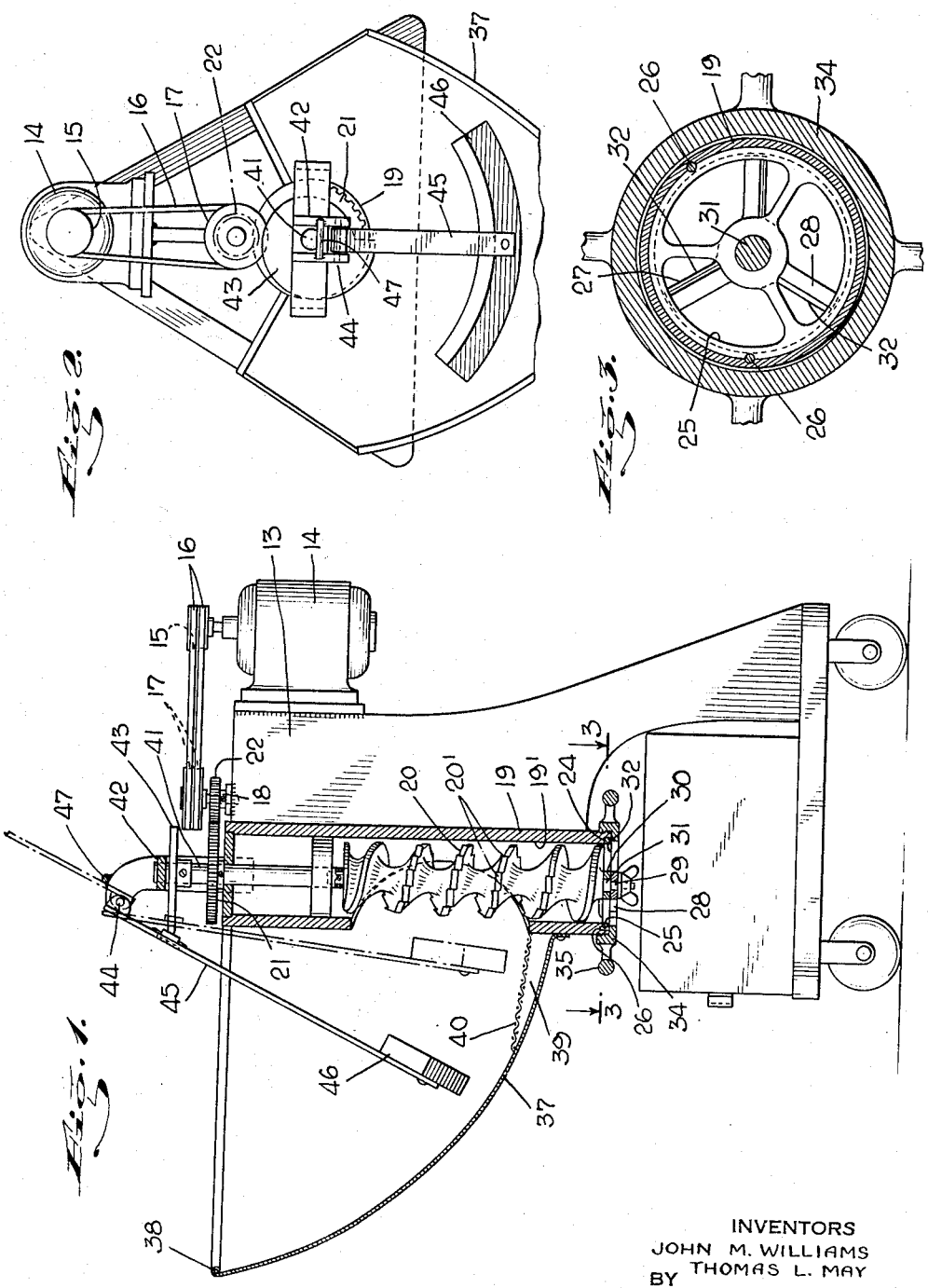
INVENTORS
JOHN M. WILLIAMS
THOMAS L. MAY
BY
Howard Thompson
ATTORNEY Patented Aug. 4, 1953

2,647,694

UNITED STATES PATENT OFFICE 2,647,694

LEAF GRINDER

John M. Williams, Madison, N. J., and Thomas L. May, Long Island City, N. Y.; said May assignor to said Williams Application September 3, 1949, Serial No. 113,914

4 Claims. (Cl. 241—81)

This invention relates to a portable apparatus which can be easily moved over a lawn or similar surface for conveniently placing leaves and the like therein to reduce the same to a relatively fine flake-like mass suitable for use as a fertilizer. More particularly, the invention deals with an apparatus of the character described having a vertically disposed feed screw with a hopper enveloping a portion of the screw to facilitate the feed of leaves thereto, part of the screw having tooth-like structures to insure feed of the leaves into the cylinder in which the screw operates. Further, the invention deals with an apparatus, wherein a cutter mechanism is employed comprising a large apertured disc with a cutter movable over the outer surface of the disc to flake the fed leaves pushed through the apertured disc by said screw.

Still more particularly, the invention deals with an apparatus having means for automatically feeding the leaves to the screw cylinder.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a vertical section through the apparatus with part of the construction shown in a different position in dotted lines.

Fig. 2 is a plan view of the apparatus; and

Fig. 3 is a section on the line 3—3 of Fig. 1.

In practice, we provide a frame 10 comprising a substantially triangular base 11 supported by suitable rollers 12 at corner portions thereof for free movement over a supporting surface. The upper end portion 13 of the frame has an electric motor 14 supported thereon with the shaft of the motor in a vertical position. On the motor shaft is arranged a pair of pulleys 15, around which pass two belts 16, the belts passing around other pulleys 17 on a stub shaft 18 supported in the upper end of the frame.

At the forward portion of the frame 13 is a vertical cylinder 19, in which is rotatably mounted a feed screw 20. The shaft of the screw protrudes through the upper end of the cylinder and has thereon a gear 21 which meshes with a pinion 22 on the shaft 18. The cylinder has a large elliptical opening 23 opening into what may be termed the front wall of the cylinder at a point intermediate upper and lower ends thereof. The lower end of the cylinder 19 is recessed, as seen at 24, for reception of a disc 25, the disc being keyed to the cylinder as seen at 26. The disc 25 has three or more large arc-shaped apertures 27 therein, through which the leaves gathered by the screw 20 are fed by said screw to be severed by a multiple blade cutter 28 supported upon the lower reduced end 29 of the screw 20. The cutter 28 is held in position by a winged nut 30 in threaded engagement with the lower end of the shaft part 29. Adjacent the part 29 is a slightly enlarged shaft portion 31, against which the cutter 28 seats and this portion 31 is so positioned as to dispose the cutter blade edges 32 in close proximity to the lower surface of the disc 25. The disc 25 has a central bearing portion 33, in which the portion 31 operates. It will appear that the large diameter of the apertures 27 is in alinement with the bore 19' of the cylinder 19, so as to provide a free discharge of the leaves through said disc.

In threaded engagement with the lower end of the cylinder 19 is a retaining ring 34 which overlies the disc 25 to hold the latter in place. The ring 34 has a large finger-grip portion 35 to facilitate attachment and removal of the ring.

The frame 10 has side plate portions or wings 36 extending outwardly from the cylinder 19 and attached to these portions and the cylinder 19 is an upwardly and outwardly extending hopper 37. This hopper may be composed of rigid or flexible material, such as heavy canvas and, when the latter is used, the upper edge is supported by a heavy ring 38. The hopper 37 extends onto the cylinder 19 at a point below the opening 23 and this forms around the cylinder a pocket 39; the upper surface of this pocket is covered by a removable screen 40, preferably of a reasonably large mesh, such for example, as a $\frac{1}{8}''$ to $\frac{3}{16}''$ mesh. The purpose of this construction is to collect gravel, sand or the like that might be dumped into the hopper with the leaves.

At the upper end of the screw 20 is an extending shaft 41 supported in a suitable bracket portion 42 at the upper end of the cylinder. Mounted on the shaft, beneath the bracket 42, is a cam 43; pivotally supported at the upper end of the bracket, as seen at 44, is a lever 45 supporting at its lower free end portion an arc-shaped weight 46 of a contour to fit freely but snugly within the central portion of the hopper. The lever 45 is adapted to be dropped onto a batch of leaves placed in the hopper to urge the leaves in the direction of the opening 23 and the cam 43 is adapted to impart a reciprocating pounding action upon the leaves, at least when the lever is in a position, substantially similar to that illustrated in the drawing, so as to urge the small body of leaves that may be at the lower portion of the hopper into the cylinder through the opening 23. The lever 45 is adapted to be swung into a raised position and held in this position by a stop 47, the lever being in this position when leaves are inserted into the hopper 37. The hopper will be sufficiently large to take a substantial volume of leaves and, while these leaves are being picked up and fed by the screw 20 through the disc 25 and severed, the operator can be collecting another batch of leaves for insertion into the hopper. Supported upon the lower plate 11 of the apparatus beneath the lower discharge end of the cylinder 19 is a suitable box or receptacle 48 having a handle, as at 49, and this box, when filled or substantially filled with the ground or processed leaves reduced to flakes can be emptied and replaced for another filling.

Disposal of leaves has always been a great problem and, in most instances, leaves have been gathered in piles and burned, which process has been extremely wasteful and, at the same time, dangerous and has caused many fires throughout the country. By a simple and economical apparatus of the type and kind under consideration, the apparatus can be moved about over a lawn or other surface and the leaves reduced to a ground flake-like and, at times, more or less powder mass which represents a very fine and suitable fertilizer for spreading over a lawn, field or in a garden. On the other hand, the flaked leaves can be gathered in a compose pile and allowed to rot or, in such pile, chemically or otherwise treated to produce an exceptionally fine fertilizer. By using an apparatus of this type and kind, the need for purchasing fertilizers is dispensed with, thus the apparatus will automatically pay for itself in a relatively short period of time by virtue of the saving effected in the purchase of fertilizers.

The peripheral edges of the screw 20, particularly where they register with the opening 23, have circumferentially spaced tooth-like projections 29' which will aid in picking-up and feeding the leaves into the cylinder 19. It will also be understood that different types and kinds of discs 25 can be used in the control of the size of the flakes or grains discharged from the apparatus. In some instances, it may be desirable to operate on the basis of a double operation, that is to say, a first cutting, where the flakes would be relatively large, then removing the disc employed for the heavy cut and substitute a disc having smaller perforations therein and then re-running the flakes through the apparatus to reduce the flakes to a finer grain.

Having fully described our invention what we claim as new and desire to secure by Letters Patent is:

1. A leaf grinding apparatus of the character described, comprising a vertical frame having a triangular base, a cylinder arranged vertically in and extending the major portion of the length of said frame, the lower end of the cylinder being arranged above and spaced from said base, a feed screw mounted in the lower portion of said cylinder and having a shaft extending at the top of said cylinder, said cylinder having an opening intermediate and widely spaced from its ends for delivery of products to the cylinder for feed by said screw, a motor on the upper portion of the frame, means comprising a gear train between the shaft of the motor and said screw shaft for actuating said screw, said cylinder being open at its lower end, an apertured disc fixed to the open end of the cylinder, a cutter mounted on the feed screw outwardly of and moving over the surface of said disc to cut products fed by said screw through the apertures of said disc, and a hopper materially larger in diameter than the diameter of said cylinder and encircling more than one-half of the diameter of the cylinder for supporting a relatively large body of products around and beyond the upper and lower limits of the cylinder opening for delivery to the opening of said cylinder.

2. A leaf grinding apparatus of the character described, comprising a vertical frame having a triangular base, a cylinder arranged vertically in and extending the major portion of the length of said frame, the lower end of the cylinder being arranged above and spaced from said base, a feed screw mounted in the lower portion of said cylinder and having a shaft extending at the top of said cylinder, said cylinder having an opening intermediate and widely spaced from its ends for delivery of products to the cylinder for feed by said screw, a motor on the upper portion of the frame, means comprising a gear train between the shaft of the motor and said screw shaft for actuating said screw, said cylinder being open at its lower end, an apertured disc fixed to the open end of the cylinder, a cutter mounted on the feed screw outwardly of and moving over the surface of said disc to cut products fed by said screw through the apertures of said disc, a hopper materially larger in diameter than the diameter of said cylinder and encircling more than one-half of the diameter of the cylinder for supporting a relatively large body of products around and beyond the upper and lower limits of the cylinder opening for delivery to the opening of said cylinder, means for urging the products in the hopper in the direction of the opening of said cylinder, said last named means comprising a pivoted lever having an end extending into said hopper, and an arc-shaped weight fixed to said end of the lever, and means comprising a cam on said shaft for intermittently actuating said lever to move the arc-shaped weight toward and from said opening.

3. A leaf grinding apparatus of the character described, comprising a frame, a cylinder in the frame having a lower open discharge end, said cylinder intermediate and widely spaced from its ends having an opening for feed of material into the cylinder, a hopper materially larger in diameter than the diameter of said cylinder and encircling more than one-half of the diameter of said cylinder for supporting a relatively large body of products around and beyond the upper and lower limits of the cylinder opening, a pivoted lever having an end operating in said hopper, an arc-shaped weighted member fixed to said end of the lever and movable in the hopper to urge material in the direction of the cylinder opening, means in the cylinder for picking up and feeding material urged into the cylinder opening longitudinally of the cylinder to said discharge end, and means at the discharge end of the cylinder for cutting the material in the feed through said end.

4. A leaf grinding apparatus of the character described, comprising a frame, a cylinder in the frame having a lower open discharge end, said cylinder intermediate and spaced from its ends having an opening for feed of material into the cylinder, a hopper materially larger in diameter than the diameter of said cylinder for supporting a relatively large body of products around and beyond the upper and lower limits of the cylinder opening, an arc-shaped weighted member movable in the hopper to urge material in the direction of the cylinder opening, means in the cylinder for picking up and feeding material urged into the cylinder opening longitudinally of the cylinder to said discharge end, means at the discharge end of the cylinder for cutting the material in the feed through said end, means at the upper end of the cylinder for driving said feed means, said driving means operatively engaging said member to automatically move the same toward and from the cylinder opening, and the lower end portion of the hopper, at a point below the cylinder opening, having means for collecting foreign particles delivered to the hopper.

JOHN M. WILLIAMS.
THOMAS L. MAY.

References Cited in the file of this patent

UNITED STATES PATENTS

| Number | Name | Date |
|---|---|---|
| 1,476,880 | Earle | Dec. 11, 1923 |
| 1,593,692 | Corey | July 27, 1926 |
| 2,106,711 | Berkman | Feb. 1, 1938 |
| 2,109,048 | Lorenzen | Feb. 22, 1938 |
| 2,143,202 | Martinet | Jan. 10, 1939 |
| 2,344,591 | Bried | Mar. 21, 1944 |
| 2,495,309 | Amstutz | Jan. 24, 1950 |

FOREIGN PATENTS

| Number | Country | Date |
|---|---|---|
| 329 | Great Britain | July 6, 1908 |
| 110,131 | Great Britain | Oct. 11, 1917 |
| 395,944 | Germany | May 23, 1924 |
| 329,128 | Great Britain | May 15, 1930 |
| 145,137 | Switzerland | May 1, 1931 |
| 657,841 | Germany | Mar. 14, 1938 |
| 359,305 | Italy | May 18, 1938 |